United States Patent
Othmer et al.

(10) Patent No.: US 7,227,930 B1
(45) Date of Patent: Jun. 5, 2007

(54) SYSTEMS AND METHODS FOR CRITERIA-BASED RECORDING OF VOICE DATA

(75) Inventors: Konstantin Othmer, Mountain View, CA (US); Michael P. Ruf, Parkland, FL (US)

(73) Assignee: Core Mobility, Inc., Mountain View, CA (US)

( * ) Notice: Subject to any disclaimer, the term of this patent is extended or adjusted under 35 U.S.C. 154(b) by 0 days.

(21) Appl. No.: 10/969,487

(22) Filed: Oct. 20, 2004

(51) Int. Cl.
*H04M 1/64* (2006.01)

(52) U.S. Cl. .................. 379/85; 379/88.25; 455/412.1; 455/456.3

(58) Field of Classification Search ................ 379/85, 379/88.23, 88.25; 455/412.1, 456.3
See application file for complete search history.

(56) References Cited

U.S. PATENT DOCUMENTS

| | | | | |
|---|---|---|---|---|
| 6,072,860 A * | 6/2000 | Kek et al. | ................. | 379/88.25 |
| 6,389,398 B1 * | 5/2002 | Lustgarten et al. | ......... | 704/275 |
| 6,401,066 B1 * | 6/2002 | McIntosh | ..................... | 704/273 |
| 6,665,376 B1 * | 12/2003 | Brown | ......................... | 379/85 |
| 2001/0016491 A1 * | 8/2001 | Imura et al. | ................. | 455/432 |
| 2002/0016175 A1 * | 2/2002 | Marce et al. | ................ | 455/466 |
| 2002/0160751 A1 * | 10/2002 | Sun et al. | .................... | 455/412 |
| 2003/0069804 A1 * | 4/2003 | Barry et al. | .................. | 705/26 |
| 2004/0203927 A1 * | 10/2004 | Kraft | ........................ | 455/456.2 |
| 2005/0113113 A1 * | 5/2005 | Reed | ........................ | 455/456.3 |

\* cited by examiner

*Primary Examiner*—Fan Tsang
*Assistant Examiner*—Hemant Patel
(74) *Attorney, Agent, or Firm*—Workman Nydegger

(57) ABSTRACT

Wireless telecommunications systems, methods and devices for processing voice data in connection with a wireless telecommunications system that includes a wireless remote device and a wireless recording device that are configured for communication with a network server. In connection with transmission of voice data from the remote device to the recording device, the recording device obtains information concerning the geographic location of the recording device or the remote device. The recording device accesses recording rules that cross-reference the geographic location of the recording device or the remote device with a corresponding recording statute. The recording device records the conversation if the recording statute indicates that such recording is lawful.

37 Claims, 9 Drawing Sheets

| | | | |
|---|---|---|---|
| 802 | I | J1-SP<br>J2-SP | Record |
| 804 | II | J1-SP<br>J2-AP | Default No Record - or -<br>Record With Limitations |
| 806 | III | J1-AP<br>J2-SP | Default No Record - or -<br>Record With Limitations |
| 808 | IV | J1-AP<br>J2-AP | Default No Record - or -<br>Record With Limitations |

SYSTEMS AND METHODS FOR CRITERIA-BASED RECORDING OF VOICE DATA

BACKGROUND OF THE INVENTION

Related Applications

Not applicable.

Field of the Invention

The present invention relates generally to telecommunications systems, methods and devices. More particularly, exemplary embodiments of the invention concern systems and methods directed to selectively capturing voice data during a communication session, such as a telephone call, and managing the recorded voice data.

Related Technology

As a result of various technological advances, the functionality and capabilities of traditional, landline telephones and wireless communication devices such as mobile telephones, "smart phones" and telephony-enabled personal digital assistants (PDAs) (hereinafter referred to as wireless communication devices) having correspondingly improved and expanded. In particular, a significant advancement in this regard is the relative increase in memory capacity associated with wireless communication devices. Such expanded memory capacity lends itself to a variety of useful applications. For example, improved memory capacity allows additional applications to be employed in connection with the wireless communication device, thereby enhancing its overall functionality. Another technical advancement in wireless communication is the ability to identify the geographical location of the user of a wireless communication device at any point in time. Together, these technologies enable a particularly useful application for communication devices, namely, the ability of users to record their conversations with other parties. As discussed below, this functionality is useful for a variety of reasons.

For example, a user may wish to record a conversation with his or her stockbroker so in the event that a dispute arises concerning directions given to the stockbroker by the user, a transcript of the recorded conversation can be used to resolve the dispute. As another example, one or both parties to a conversation may wish to preserve the conversation for future reference or for historical, archival, or other purposes. Additionally, journalists and reporters often find it useful to record conversations. Finally, it is frequently desirable for law enforcement personnel to be able to record telephone conversations since such conversations often provide useful evidence that can later be used in the prosecution of civil or criminal investigations.

While there is little question that the ability to record conversations conducted by way of devices such as wireless and landline telephones is useful in many cases, certain complications may arise when one of the parties to the conversation is either unwilling to have the conversation recorded or is unaware that the conversation is being recorded. In this regard, there are a variety of state and federal wiretap laws, violations of which can expose the recording party to both civil and criminal liability, that identify various circumstances under which such conversations may or may not be recorded. The situation is further complicated by the fact that wiretap laws may vary from one jurisdiction to another.

Thus, it is often the case that a party who wishes to record a telephone conversation, for example, cannot be certain that recordation of the telephone call is lawful unless that party is familiar with the applicable laws for the location from which it is calling and knows with some degree of certainty the location of the other party to the call. Moreover, even if the prospective recording party were to request information from the other party concerning the location of that party, there is often little assurance that such other party will provide truthful information. Even where a party intends to provide accurate location information, that party may not know its location to the degree of accuracy necessary. In either case, the ability of the prospective recording party to ascertain the lawfulness of recording a conversation is compromised.

A related difficulty concerning the lawfulness of recording telephone conversations concerns the inherent ability of a wireless communication device user to move from one location to another during the pendency of the conversation. That is, because the location of one or both of the parties to the conversation, or to subsequent conversations, may change from day-to-day or hour-to-hour, the party desiring to record the conversation cannot be certain of the jurisdiction wherein the other party is located and, accordingly, can be severely handicapped in determining whether or not any particular conversation or portion of the conversation can be lawfully recorded. Moreover, the availability of technologies and features such as call forwarding and virtual phone numbers make it even more difficult for a party wishing to record a conversation to reliability determine the geographical location of the other party or parties in order to determine and comply with the applicable wire tap laws.

Further, even when the location of the parties to a conversation can be reliably located, the party desiring to record the conversation may be faced with a situation where the wiretap laws of one jurisdiction indicate that the recording of the conversation is lawful, while the wiretap laws of another jurisdiction in which one of the parties is located indicate that the recording of the conversation is unlawful. Such a situation may arise, for example, where one party to the conversation is in one state and the other party to the conversation is located in another state at the time the conversation takes place. In cases such as these, it may be difficult for the party desiring to record the conversation to reach a decision as to whether or not to record, since the recording may be illegal in one jurisdiction, but not in the other jurisdiction. Moreover, it is likewise unclear as to which jurisdictional wiretap laws should take precedence in the event of a conflict. A related consideration is that federal wiretap laws may apply to conversations that take place across state lines, or conversations where one party is located outside the United States.

A related concern is that the fact that wiretap laws may vary from one jurisdiction to another does not necessarily shield the recorder from liability if the recorder elects to record the conversation consistent with the more lenient wiretap laws. In particular, an aggrieved party may elect to 'forum shop' and bring an action in the jurisdiction with the relatively stricter wiretap laws.

Problems such as those discussed above can prove highly detrimental. This is particularly true in the context of law enforcement efforts where, as noted above, recorded telephone conversations can provide valuable evidence. However, violations of the applicable statutes may result in the inadmissibility of such evidence.

In view of the foregoing, it would be advantageous to provide a system that can attempt to determine the geographical location of the parties to a communication session and, based on the applicable wiretap laws, facilitate the process of meeting the requirements for lawfully recording the voice data and then record the voice data. In the event that the system cannot reliably determine the geographical locations of the parties to the communication session, the current best way to ensure the legality of recording the voice data from a communication session is to obtain the explicit consent of the parties to the conversation, regardless of the jurisdiction in which the parties reside. Similarly, if the recording party wishes to obtain explicit consent from the parties to record the voice data, it would be advantageous to provide a system that can manage the process of obtaining and recording the consent manifested by the parties. The system should further provide for automatic notification to the parties that the voice data is being recorded. Finally, the system should also provide functionality that allows a recording party to record only his or her own voice and not the voices of the other parties to the communication session, as well as provide for the proper storage and handling of any voice data ultimately recorded.

BRIEF SUMMARY OF AN EXEMPLARY EMBODIMENT OF THE INVENTION

In general, exemplary embodiments of the invention concern wireless and/or landline telecommunications systems, devices and methods directed to determining the locations of parties to a communication session, and recording the voice data transmitted during the communication session based on the wiretap laws for those locations or making recommendations to the recording party for lawfully recording the voice data. More specifically, embodiments of the invention provide for attempting to locate the parties to the communication session, notifying the parties that voice data is being recorded; obtaining, recording and managing the consent of the parties to the communication session to record the voice data, capturing selected voice or other transmitted data, associating the recorded voice data with the consent given, and storing and managing the recorded voice data, associated consent and associated access rules. In one embodiment, a recording party may decide to record only his or her own voice data from the communication session, and not record the voice data generated by the other parties to the communication session.

In one exemplary embodiment of the invention, recording management client software is installed on a wireless communication device to implement a method for recording voice data transmitted during a communication session. A communication session may be defined as the transmission of data, including voice data, using any combination of wireless or landline devices and using any type of network, including the Public Switched Telephone Network (PSTN), a cellular network, and wireless local area network (WLAN), a packet data based network such as the Internet, or any other type of network or combination of networks capable of transmitting data between the devices. For convenience in describing embodiments of the invention, a communication session may be referred to herein as a "telephone call", a "call" or a "conversation"; however the invention should not be construed to be limited to conventional telephone calls. The wireless or landline communication device may be referred to in various ways, depending upon its role with respect to voice data that is sent between devices during a communication session. When these terms are used to identify and distinguish the communication devices that are used in a communication session in which voice data is recorded, the term "recording device" is defined as the device that is operated by the user or "recording party" who requests and controls the recording operations using the recording management software installed on the device. These recording operations can be performed to record incoming voice data received at the recording device from another party participating in the communication session, to record voice data generated locally at the recording device, or both. Various technologies and file formats used for recording audio data can be used in conjunction with the systems and methods of the present invention. Depending on the configuration of the recording device, voice data may be formatted and stored using EVRC, MP3, WMA or any other audio format suitable for use on wireless devices. The recorded voice data may then be stored locally on the recording device or uploaded to a server using any of a number of transport protocols, such as MMS. Alternatively, the recorded voice data can be streamed to a server as it is recorded using User datagram Protocol (UDP), Real Time Streaming Protocol (RTSP), HTTP or any other suitable data streaming protocol and stored for later access. As described in greater detail below, the recording operation can be performed locally at the recording device or at a remote recording device, such as a recording management server, that is controlled by the recording party who operates the recording device.

In this context, the term "remote device" is defined as the device that is operated by the "remote party" participating in the communication session, or, in other words, by the non-recording party. The remote device may or may not have the recording management client software installed.

The communication devices used by the parties to a communication session are suitably equipped to establish recording connectivity and engage in communication over a recording. An exemplary wireless communication device generally comprises a processor that communicates with a transmitter with global positioning system ("GPS") functionality, a receiver, and a memory. An input/output ("I/O") connection or other device of comparable functionality for sending data over a network is also provided so as to enable uploading of recorded conversations.

The recording management client software installed on the wireless device implements recording management functionality such as 'record,' 'record setup,' and 'standby.' More particularly, the recording management client software enables a recording party to obtain and record consent from the parties, record voice data on demand, specify or access predetermined settings and preferences such as criteria for automatically recording voice data, store the recorded voice data locally on the device, and upload or stream the voice data to the recording management server.

The recording management server is employed in support of the recording functionality on the recording device and may perform various functions, including determining and tracking device location, maintaining information pertaining to wiretap laws, notifying the parties to the conversation that the voice data is being recorded, receiving and storing recorded consent and voice data, and managing data recording rules, user profiles, access permissions, and recorded voice data.

In one exemplary operation, a caller uses a wireless communication device to initiate a communication session with another party. The communication device of the remote party may or may not comprise a wireless communication device as well. In the exemplary embodiment, the remote recording does not have the recording management client software installed on her device. The recording party indicates to the recording management client software installed on the recording device that he wishes to record the voice data being transmitted. The recording management server then attempts to determine the geographical location of the parties to the communication session. If the system can determine the location of the parties, the locations are then correlated to various rules that identify the wiretap laws for those jurisdictions. The rules may be stored on and maintained by the recording management client software, the recording management server, or both. Based upon the requirements dictated by the applicable wiretap laws, the recording management client software either records, does not record, or records with limitations, some or all of the conversation between the recording party and one or more remote parties. An access profile that defines the nature and scope of rights or permissions with respect to the recording is then associated with the recording and the recording and access profile are retrievably stored either at the wireless communication device or another location.

In some cases, the recording management server may be unable to reliably determine the location of the remote parties. For example, if one of the parties has forwarded all telephone calls from their wireless device to a landline telephone which utilize Voice over Internet Packet (VoIP) technology, the recording management server can recognize that a VoIP service provider is terminating the call. The recording management server will then attempt to determine the location of the landline telephone by using IP tracing techniques, which can map the geographical location of devices with IP addresses, in this case a VoIP telephony device. If the attempt is unsuccessful for some reason, the recording management server may recommend to the prospective recording party that explicit consent be obtained before recording the voice data.

In another case, the recording party may wish to obtain consent of the remote parties for any number of other reasons. In this case, depending upon the instructions provided to the recording management system by the recording party, the recording management server may simply play a pre-recorded message, such as "this communication session is now being recorded" to the remote parties indicating that voice data recording has commenced, and it may thereafter play an audible tone, or provide some other indicator periodically to indicate to the remote parties that voice data recording is proceeding. In this case, the continued participation of the remote parties in the communication session is construed as implicit consent by the remote parties to record the voice data. Alternatively, either automatically or in response to a request by the recording party, the recording management system may request and record explicit consent from each of the parties to the communication session approving recordation of the voice data. The recorded voice data from each of the parties is then associated with the corresponding consent information and stored in the recording management system.

In yet other situations, the recording party may simply choose to record his own voice data, that is, only the voice data input locally at the microphone of the recording device, and to not record the voice data of the remote parties.

In any case, the recorded voice data, along with the consent obtained from any of the remote parties, may then be stored locally on the device for access at a later time. The recorded voice data may also be uploaded from the device, using any of a number of standard transport protocols, and stored on the recording management server, where the recorded voice data can be further processed and accessed in accordance with certain rules and permissions.

These and other aspects of embodiments of the present invention will become more fully apparent from the following description and appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF EMBODIMENTS OF THE INVENTION

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

In general, embodiments of the invention are concerned with wireless communication devices, such as wireless telephones and radios, in connection with which software and various methods and processes may be employed that reliably guide the user in the recording, preservation, and use of recorded voice data transmitted during a communication session. Among other things, embodiments of the invention make use of the wiretap laws of various jurisdictions in order to make a determination as to whether or not voice data may be recorded and if so, with what sort of constraints or permissions on use and access. Embodiments of the invention further provide methods for obtaining and managing consent given by the parties of a communication session to record voice data, as well as methods for recording only the voice data of the recording party and not recording the voice data of the remote parties.

I. Operating Environments and Associated Devices

Figure 1:
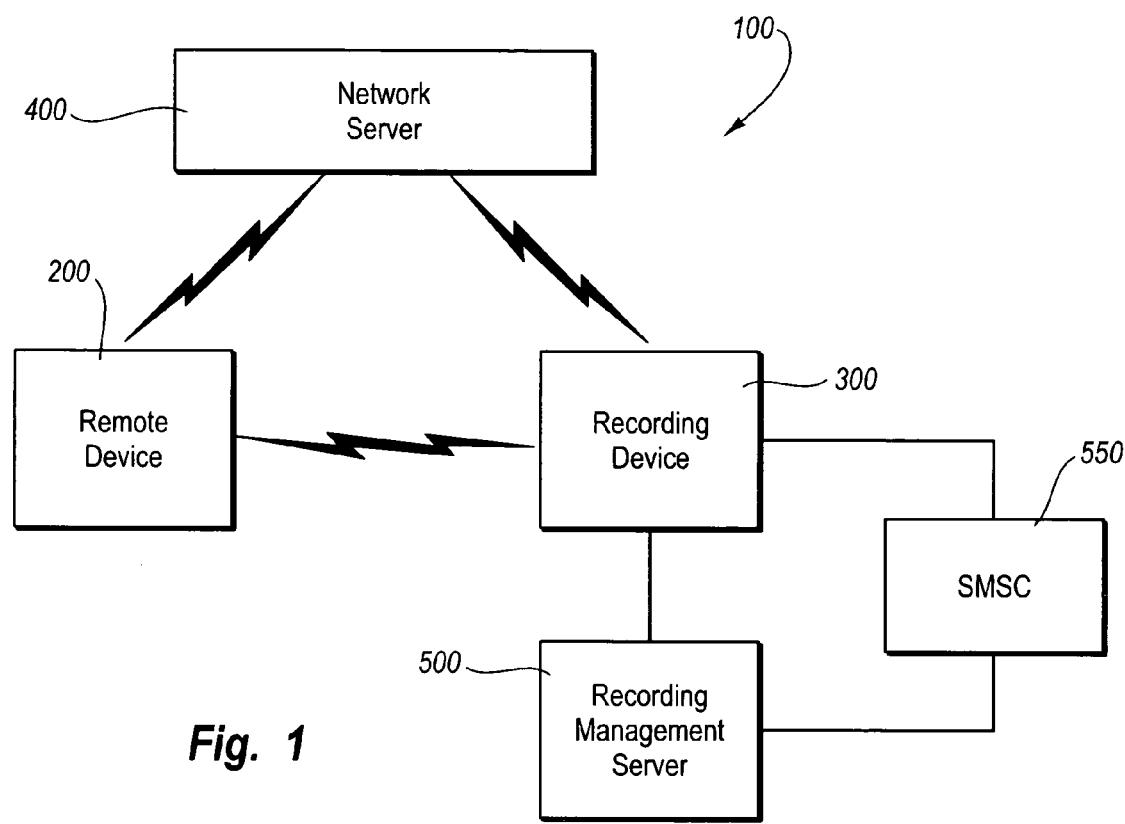
FIG. 1 is a schematic view illustrating aspects of an exemplary operating environment for embodiments of the invention.

With particular attention now to FIG. 1, one exemplary implementation of an operating environment, specifically, a wireless telephone network denoted generally at 100, is indicated. Although this exemplary operating environment comprises a wireless telephone network, it should be understood that the scope of the invention is not so limited. Rather, embodiments of the invention may be employed in connection with any other type of network and associated devices that are effective in implementing or facilitating wireless communication or landline communication between two or more devices. Accordingly, the scope of the invention should not be construed to be limited to the exemplary operating environment indicating in FIG. 1.

In the exemplary illustrated embodiment, the wireless network 100 includes a wireless communication device of a caller, designated as remote device 200, configured to communicate with a wireless communication device of a telephone call recipient who wishes to record the telephone call, designated as recording device 300. Both the remote device 200 and the recording device 300 are configured to communicate with a network server 400 associated with the wireless telephone network 100. As discussed in further detail below, the network server 400 may be associated with provision of a service to the remote devices, such as location based services which track the geographical location of wireless devices. Network server 400 could also be a Home Location Register (HLR) or Visiting Location Register (VLR) which may be employed in conjunction with the invention to determine the location of the parties to a communication session. Additionally, network server 400 could be an element of the 911 emergency system, which has location determination capabilities. Generally, network server 400 is able to obtain and provide various information concerning the location, status and operations of the remote device 200 and/or recording device 300 in connection with the wireless telephone network 100. As further indicated in FIG. 1, at least the recording device 300 is configured to communicate with a recording management server 500 that may be embodied, in one implementation, as a server operating within wireless network 100.

It should be noted both with respect to the remote device 200 and the recording device 300, that such devices refer in the most general sense to devices that, respectively, are able to at least transmit and receive wireless communications such as, but not limited to, voice data embodied in the form of wireless communications. Such voice data may comprise, for example, an entire conversation, or a portion of a conversation. Further, the terms "remote device" and "recording device" are used herein as a matter of convenience and are not intended to imply a limit to the scope of the functionality of either device. Remote device 200 and recording device 300 are typically wireless telephones or telephony-enabled wireless communication devices such as PDAs or smartphones. As noted elsewhere herein, however, the disclosed functionality may alternatively be implemented in connection with arrangements where either the remote device 200 or recording device 300 comprises a landline device.

Figure 2:
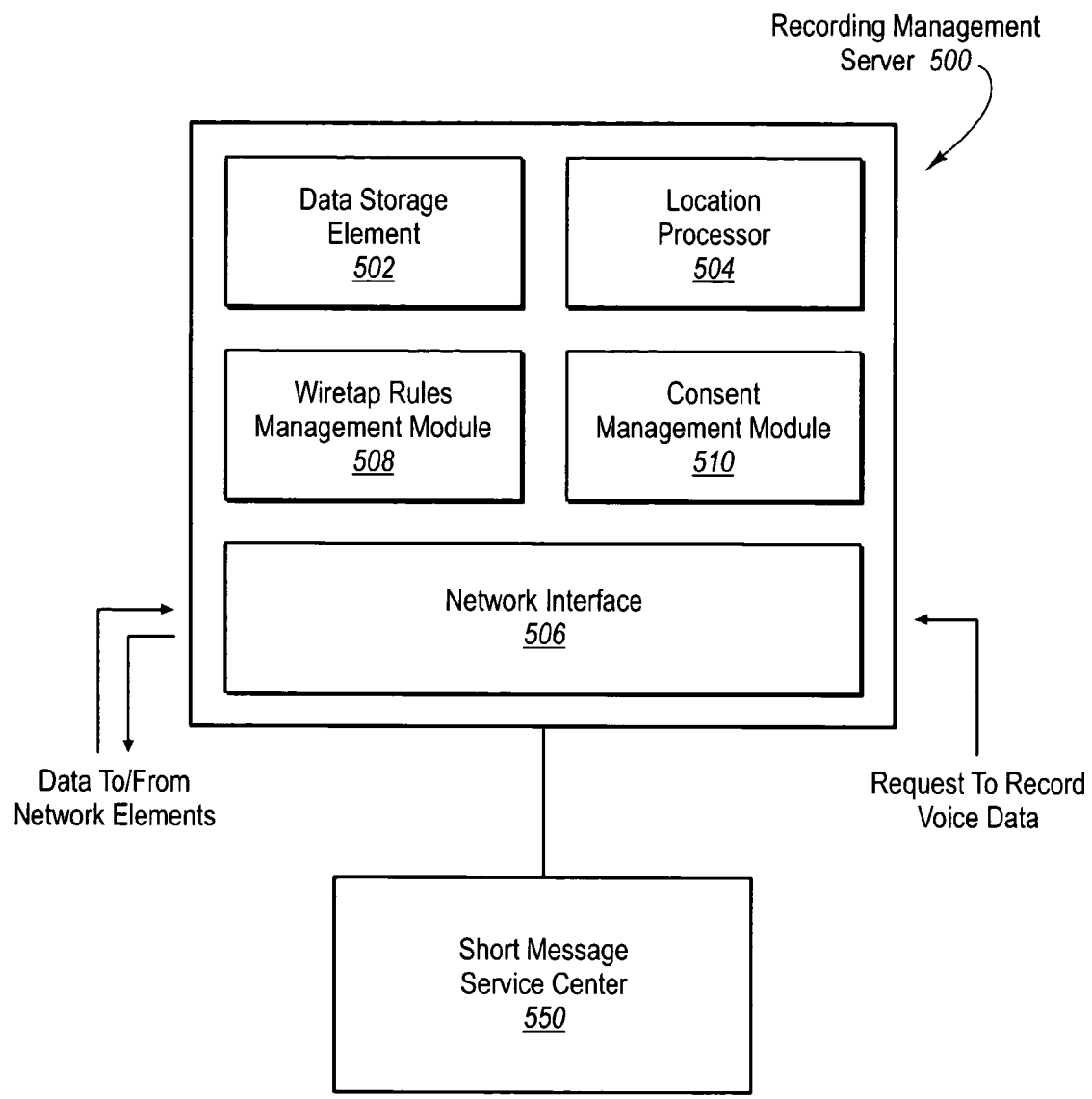
FIG. 2 is a schematic view illustrating aspects of a recording management server.

Directing attention now to FIG. 2, details are provided concerning an example of a recording management server 500. Recording management server 500 operates in conjunction with one or more recording devices 300 and may be implemented as a network element within the service provider network or as a hosted server that communicates with one or more network elements, such as network server 400, within the service provider network. Recording management server 500 includes a data storage element 502 for storing recorded voice data and associated consent. Location processor 504 receives requests from recording devices 300 to record voice data from a communication session. The request from recording device 300 is sent to network interface 506 using a mobile originated short message service message (MO-SMS) or any other suitable messaging or data transmission mechanism. Network interface 506 passes the request to location processor 504 which then attempts to determine the location of the recording device and the associated remote device(s).

In an alternative embodiment, recording device 300 may request location information directly from one or more remote devices, and the remote devices may report their location directly back to recording device 300 using the aforementioned SMS messaging techniques or other data transmission techniques. Methods for locating the devices may include employing various positioning techniques such as those provided by global positioning systems or network based positioning systems that typically rely on triangulation of the signal from cell sites serving a wireless device. As such, the serving cell site can be used as a fix for location of the user. Depending upon the configuration of the wireless devices, recording management server 500 can obtain the device location information from a GPS server, or from an HLR, a VLR or another network element that tracks the location of devices.

Additionally, recording management server 500 may obtain information from a switch or a router in the network element of the 911 system, for example, to identify the geographical location of a party using a landline communication device, such as a landline telephone. For example, if a remote party has forwarded all telephone calls from his wireless device to a landline device on a circuit-switched network, the terminating switch is determinant of the landline device location, and the recording management server may determine the location information of this remote party from the location of the switch. Furthermore, wiretap rules management module 508 maintains the rules and requirements for each jurisdiction having associated wiretap laws and receives input from location processor 504 concerning the geographical location of the parties to the communication session. Once received, the geographical locations are correlated with the jurisdictions corresponding to the geographical locations, processed in the rules management system and the requirements for lawfully recording the voice data are determined. The consent management module 510 then uses the location information, and other pertinent information, to determine whether consent of the non-recording party is required, or at least advisable. Further details concerning consent management processes are provided below in connection with the discussion of FIG. 12.

Finally, recording management server 500 may further interface with a Short Message Service Center (SMSC) 550 in order to exchange short message service (SMS) messages with recording device 300 and with other network elements, such as various location positioning systems. Such SMS messages may contain recording management system commands such as a request to record, or location information or other information that directs the behavior of the recording management system.

Figure 3:
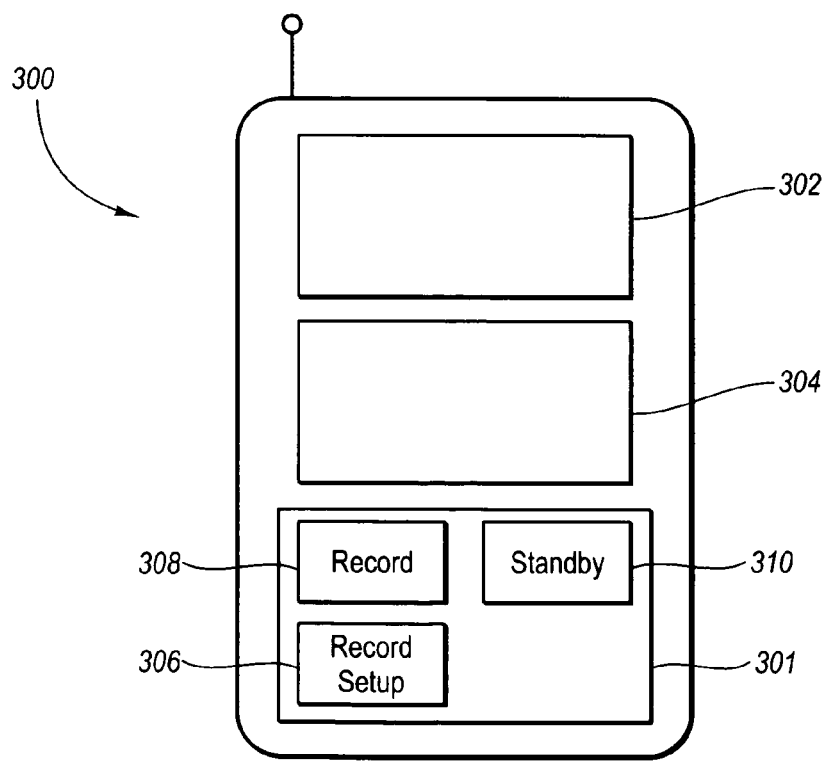
FIG. 3 is a schematic view of an exemplary implementation of a wireless communication device that provides a suitable operating environment for recording management client software.

Directing attention now to FIG. 3, further details are provided concerning an exemplary implementation of the recording device 300. In some implementations, the remote device 200 may be similar or identical to the recording device 300 in terms of structure and/or functionality. Accordingly, the following discussion is germane to at least some implementations of the remote device 200 as well.

The illustrated embodiment of the recording device 300 includes various features typical of wireless communication devices such as mobile telephones and radios including, for example, a display 302 and a keypad 304. Additionally, the recording device 300 may include other features typical of such wireless communication devices, such as, not limited to, menu navigation keys, redial keys, input and output connections and an on/off switch (not shown). In addition to these typical features, the illustrated embodiment of the recording device 300 further includes recording management client software 301 which implements recording functions such as RECORD SETUP 306, RECORD 308, and STANDBY 310. In some cases, recording functionality may be accessed and manipulated by the user of the recording device. For example, a recording party may request that voice data be recorded on a call by call basis, which requires intervention by the recording party to set up the recording session. In other cases, the recording functionality occurs as a background process not accessible by the user. For example, a recording device may be pre-programmed to always record the voice data received from a particular remote device. Recording functionality that is accessible by the user can be implemented using physical buttons on a keypad, soft buttons on a graphical user interface, spoken commands or other user interface elements that enable the user to select the corresponding operations.

As disclosed in further detail herein, RECORD SETUP 306 generally allows a user to request a recording session on demand and to specify various criteria to be used in making determinations as to the recording and other handling of a telephone conversation conducted in connection with the recording device 300. More specifically, the RECORD SETUP function manages the request of the recording party to record voice data, and sends the request to network interface 506 of recording management server 500. In another implementation, the request is sent directly to the remote device in order to determine its location. As part of the RECORD SETUP function, recording management client software 301 receives and processes consent from remote parties, either by recording spoken consent from the remote party or by receiving signals from the remote device, such as one or more dual tone multi frequency (DTMF) signals or "touch tones" which are indicative of consent. Additional details regarding the manner in which consent of the other party in the conversation can be obtained and documented, if necessary, is disclosed elsewhere herein, for example, with reference to FIG. 11. In some implementations of the invention, RECORD SETUP 306 is used to preconfigure voice data recording criteria that may not be configurable by the user so that only select aspects of the record process can be determined by the user of the recording device 300. In other situations, the user may employ RECORD SETUP 306 to specify preferences for automatically recording voice data received from particular devices without having to go through the location determination process. Generally, the particular functionalities that are implemented in connection with the RECORD SETUP 306 function may be varied as necessary to suit a particular application or requirement.

The same is generally true with respect to the RECORD 308 function. That is, a variety of different record modes, and aspects of such record modes, may be defined in connection with use of the RECORD 308 function. Exemplarily, such record modes may be accessed and activated by way of a menu displayed by the recording device. As in the case of the RECORD SETUP functionalities, some or all of the various RECORD modes may be predefined or may alternatively be defined by the user. More generally, the various RECORD modes, as well as the way in which they are defined, may be selected as necessary to suit the requirements of a particular application. Accordingly, with respect to both the RECORD SETUP and RECORD functionalities, the scope of the invention should not be construed to be limited to any particular group or combination of functionalities. Rather, the groups and combinations of functionalities disclosed herein are exemplary only.

With continuing reference to FIG. 3, STANDBY 310 generally allows the user to exit any RECORD mode at any time so that any recording then in progress will cease. Moreover, no further conversations will be recorded while the recording device 300 is in the STANDBY mode.

Figure 4:
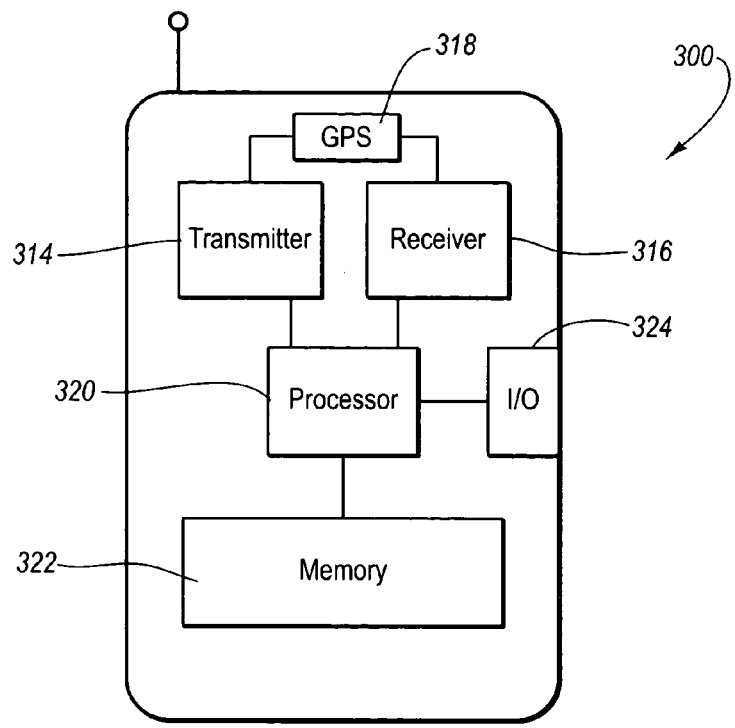
FIG. 4 is a schematic view of an exemplary implementation of a wireless communication device with the top cover removed to show various components and their relationship to each other.

With attention now to FIG. 4, a brief description is provided concerning various components of an exemplary implementation of a recording device 300. In the illustrated embodiment, the recording device 300 is equipped to communicate with wireless network 100 (FIG. 1). Recording device 300 further includes a transmitter 314 and receiver 316 that operate, or are configured to operate in connection with, a global positioning system ("GPS") module 318. Recording device 300 may also be equipped to communicate with and report to a location-based service that tracks the geographical location of the device. A processor 320 is also provided that is configured for communication with the transmitter 314 and the receiver 316, as well as with a memory 322 and an input/output ("I/O") device 324.

II. Recording Functionalities

Figure 5:
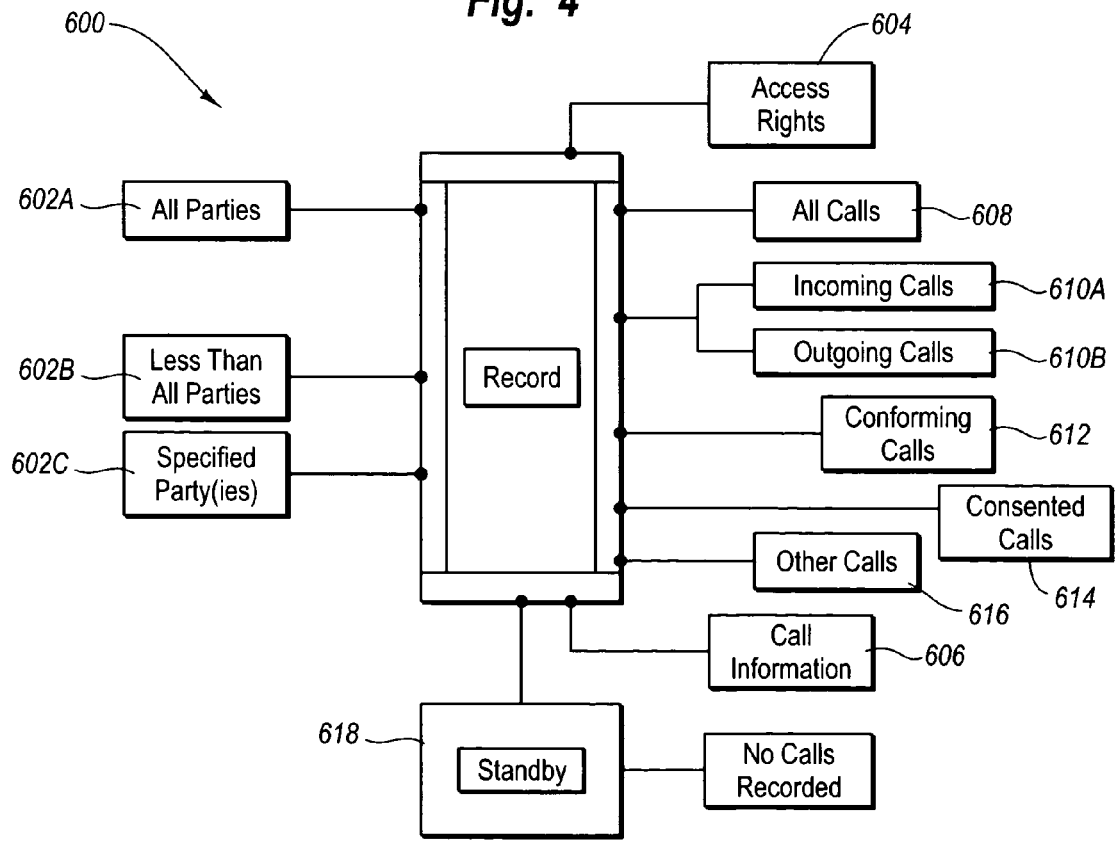
FIG. 5 is a conceptual depiction indicating examples of variables that may effect the recording of telephone conversations.

Turning now to FIG. 5, attention is directed to a conceptual depiction 600 of various considerations that may affect recording processes contemplated or performed in connection with embodiments of the invention. In at least some implementations, some or all of such considerations may be defined and implemented in connection with RECORD SETUP 306 such as was discussed earlier in connection with FIG. 3. As indicated in FIG. 5, one element of recording processes concerns the party 602 involved in the conversation which has been recorded, or which is being considered to be recorded. For example, some recording processes may be set up and configured so that the transmissions of all parties to the conversation are recorded, as indicated at 602A.

In other implementations, recording procedures and processes 602B may be defined where the transmissions of less than all of the parties to a particular conversation are recorded. For example, in a two party conversation, it may be desirable, or necessary, that only the transmissions of one party be recorded. Finally, as indicated at 602C, some recordings may be configured and arranged so that only transmissions from specified parties are recorded. As discussed in further detail below, the parameters indicated at 602A through 602C may be specified for use in connection with a single call, groups of calls, or for all calls.

Figure 8:
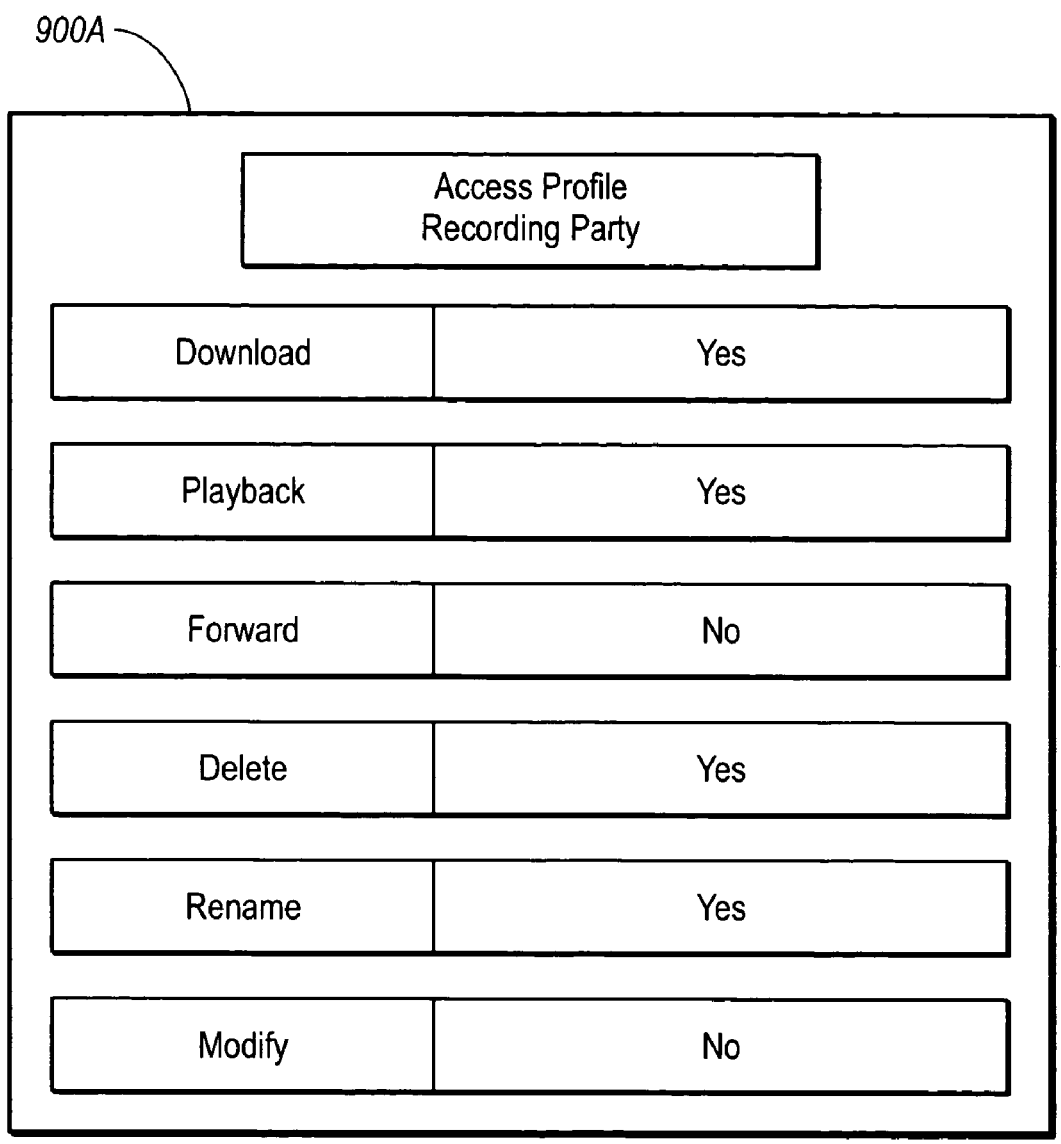
FIG. 8 illustrates aspects of an exemplary access profile such as may be constructed with respect to the rights and privileges of a recording party with respect to a recorded conversation.

With continuing reference to FIG. 5, various access rights 604 may likewise affect whether, when and how to record a conversation or portion thereof. Further details concerning aspects of such access rights 604 are discussed below in connection with FIGS. 6, 8 and 9. In connection with the performance of recordings, other related information may be recorded as well. For example, in some implementations of the invention, call information 606 such as the date and time of the call, and the duration of the call, may likewise be recorded.

As suggested in FIG. 5, the various factors used to guide decisions as to whether and how to record the voice data of a telephone conversation can be defined, combined, and employed in various ways so as to target particular types or groups of calls. For example, as indicated at 608, embodiments of the invention may be defined and configured so that all calls to a particular device are recorded.

In other cases, embodiments of the invention may be configured so that recording decisions are made with reference to whether or not the call is an incoming call 610A or an outgoing call 610B. For example, it may be specified that only incoming calls 610A are to be recorded or that only outgoing calls 610B are to be recorded. Additionally, the user may desire to record only those calls, or conforming calls 612, that conform to or satisfy a predetermined set of criteria.

Further, decisions as to whether or not to record telephone conversations may be made with reference to whether the parties to the conversation have consented to having the call recorded, that is, whether the call is a consented call 614. As discussed in further detail below, consent codes may be defined and employed in this regard when all participating devices are enabled with the recording management client software. Alternatively, if a party does not have a device that is thus enabled, spoken consent may be recorded by the recording party and associated with the recorded voice data. Of course, a variety of other calls, denoted generally at 616, may also be defined and identified as candidates for recording and subsequent use.

By way of example, some implementations of the invention provide that only consented telephone calls 614 from specified parties 602C will be recorded. As another example, the recording configuration may be specified such that only incoming calls 610A that comprise consented calls 614 will be recorded.

Finally, as indicated in FIG. 5, a STANDBY mode 618 is also defined in connection with exemplary embodiments of the invention. In the STANDBY mode 618, no calls are recorded. In other implementations of the invention, the STANDBY mode 618 may be defined and implemented such that only consented portions of calls are recorded. In one example of such an implementation, only the transmissions of the recording party are recorded.

III. Recording Relationships

Figures 6, 7:
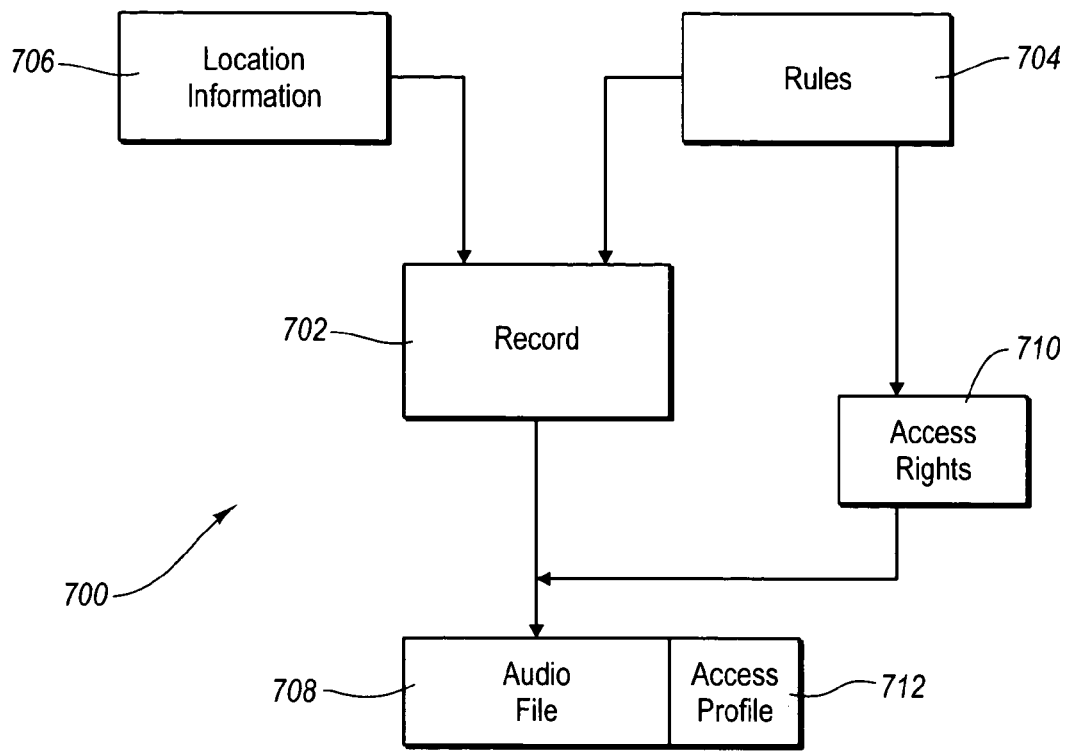
FIG. 6 is a schematic view illustrating relationships between various elements of an exemplary implementation of a recording management system.
FIG. 7 is an exemplary table of recording rules such as may be constructed to identify recording actions to be taken consistent with the wiretap laws of a particular jurisdiction.

Directing attention now to FIG. 6, details are provided concerning the relationships and interactions between various elements of a system and process 700 such as may be employed in the management of voice data transmissions.

As indicated in FIG. 6, a RECORD functional block 702 receives as inputs, various rules 704 and location information 706. In this implementation, the rules 704 enable or prevent, as applicable, various recording related activities, depending upon the geographical location of the remote device and/or recording device. Moreover, exemplary implementations of the rules 704 also include or otherwise reflect built-in, or selectable, conflict resolution provisions. As well, exemplary rules 704 also inform the prospective recorder as to whether or not notification must, or should, be provided to the other party that the call will be recorded and/or is being recorded. Examples of such conflict resolution provisions are discussed in further detail below in connection with FIG. 7.

In one exemplary implementation then, if the location information 706 specifies that the recording device and the remote device are located in Arizona, and the rules 704 provide that the applicable Arizona wiretap statute allows conversations to be recorded if only one party consents to the recording, then the recording party may record the conversation, since the recording party consents to the recording, even if the remote party has not consented, or would likely not consent if duly informed. As this example illustrates, a party to a voice data communication can obtain geographic location information concerning the device used by the party and can then apply the pre-defined data recording rules 704 to make determinations such as whether and how recording of the conversation, or a portion thereof, may proceed. The geographical location information and the application of the rules are performed automatically to avoid the need for the party to have to be familiar with the applicable statutes.

In connection with the foregoing, it should be noted that implementations of the invention may be configured to provide various levels of control over the recording of voice data. For example, some implementations of the invention reflect a relatively passive approach to the recording and management of voice data in the sense that the user of the device with which any recording is to be performed is simply provided guidance, recommendations, and feedback as to desired recording operations. The user in such implementations is nonetheless free to undertake activities that may run counter to such guidance, recommendations, and feedback.

Yet other implementations of the invention reflect a relatively more active approach to the recording and management of voice data. In particular, such embodiments are not limited simply to providing guidance, recommendations, and feedback to the user as to contemplated recording operations. Rather, such implementations automatically employ varying degrees of control over recording processes so that, for example, some desired recording processes cannot be implemented by the user if application of the recording rules indicates that such recording processes are not permitted for some reason. In implementations such as these, the user is simply prevented from engaging in certain predefined activities.

With continuing reference now to FIG. 6, and as discussed in further detail below, the location information 706 and rules 704 may be correlated in a variety of other ways as well (see, e.g., FIG. 6). Further, embodiments of the invention are not limited solely to the use of location information 706 in connection with decisions as to when, how and if a conversation may be recorded. In addition, embodiments of the invention may be configured so that location information is obtained immediately at the beginning of a call, during the call, or after the call has been completed. In some instances, the time at which the location information is obtained may be a function of the recording rules of a particular jurisdiction. Of course, various other factors may determine, as well, the time at which location information is obtained.

In any case, once a recording has been performed, an audio file 708 is created, which includes the recorded consent from any of the parties, if applicable. In alternative implementations, the recorded consent takes various other forms such as, for example, a recorded sequence of keystrokes that manifests consent to recording. At that time, various access rights 710 that are correlated with the rules 704 are used to develop an access profile 712 that is appended to, or otherwise associated with, the audio file 708. In general, the access profile 712 defines certain permitted, as well as prohibited, activities concerning the handling and management of the audio file 708.

As an example, if the rules 704 specify that recordings made in certain jurisdictions are only available for access by law enforcement officials, a corresponding access right 710 may be defined to that effect. While the corresponding access profile 712 is independent from electronic file 708, a relationship between the two is formed such that only law enforcement personnel with the specified access rights, such as may be reflected by an access code, will be able to manipulate the electronic file 708. Further details concerning examples of such access profiles are discussed below in connection with FIGS. 8 and 9.

IV. Recording Rules and Access Profiles

Directing attention now to FIG. 7, details are provided concerning an exemplary set of recording rules such as may be defined and implemented in connection with embodiments of the invention. The illustrated rules are not intended to limit the scope of the invention in any way and, more generally, various other recording rules, and combinations thereof, may likewise be defined and implemented.

As indicated in the recording rules table 800, four different cases, case I 802, case II 804, case III 806, and case IV 808 are defined in this exemplary implementation. In the exemplary recording rules table 800, J1 represents the jurisdiction where the recording device is located at the time of voice data transmission from the remote device, and J2 represents the jurisdiction where the remote device is located at the time of voice data transmission.

In case I 802, both J1 and J2 are single party consent jurisdictions, denoted as "SP" in recording rules table 800. That is, in such jurisdictions, the consent of only one party to the conversation is necessary for the conversation to be legally recorded. Thus, in exemplary case I 802, where both jurisdictions are single party consent jurisdictions, the conversation can be recorded without limitation. For example, the recording party can record transmissions from the remote party, without the consent of the remote party and without notifying the remote party that the transmissions are being recorded.

In case II 804, J1 is a single party consent jurisdiction but J2 is an all party consent jurisdiction where all parties to the conversation must give their consent before the conversation can be lawfully recorded, denoted as "AP" in recording rules table 800. In case II 804, the rule resolves this conflict by providing, as a default, that no recording should, or may, take place. This approach to the definition of the rule is conservatively biased in that such an approach errs on the side of the course of action called for by application of the law of J2, that is, recommending against, or prohibiting, the contemplated recording. Alternatively however, a less conservative bias can be reflected in the design of the rule such that the rule may be constructed to allow the recording, consistent with the application of the law of J1. It should be noted that these are exemplary conflict resolution approaches however, and the scope of the invention should not be construed to be limited simply to these examples. Further, some implementations of the invention enable the user to define and implement conflict resolution protocols.

In yet other cases, one or more rules may reflect a hybrid approach. For example, in the event of a conflict such as suggested by case II 804, the rule may be defined to provide that the recording can take place with certain limitations. Thus, such a rule may provide that the transmissions of the party in J1 can be recorded by that party, but the transmissions of the party in J2 cannot be recorded by the party in J1. Of course, various other approaches may likewise be devised and implemented.

With continuing reference to the exemplary recording rules table 800, case III 806 provides that J1 is an AP jurisdiction, while J2 is an SP jurisdiction. Thus, even though the party in J1 desires to record the transmissions of the party J2, and could do so under the rules of J2, the party in J1 is constrained by the rule of J1 which provides that both parties must consent and, since the consent of the second party has not been obtained, no recording can take place.

Finally, in exemplary case IV 808, both parties are located, during the course of the conversation, in AP jurisdictions where all parties must give consent prior to recording of a conversation or for a recorded conversation to be retained. As in cases II 804 and III 806, the default, based on the bias, is that no recording should take place. As in the other cases however, the rule may be designed to reflect a less conversation bias, or may alternatively specify that the recording may take place but with certain limitations.

While conflict resolution schemes such as those examples outlined herein are well-suited for use in connection with two party calls, such schemes may be readily adapted to situations where there are three or more parties to a call. Accordingly, the scope of the invention should not be construed to be limited for use in connection with two party calls. Rather, embodiments of the invention may be employed in connection with voice data transmissions that involve any number of parties.

Consistent with the foregoing, the actions specified by the various recording rules relate to various wiretap statutes of particular jurisdictions. Because such statutes may change from time to time, exemplary embodiments of the invention are configured to receive, such as from a website, and incorporate updated statutory information when such information becomes available. Thus, the various recording rules can be reevaluated and redefined, if necessary, to remain consistent with the updated statutory information.

As indicated earlier, recorded conversations may, in some implementations, have associated therewith an access profile 712 (see, e.g., FIG. 5) that specifies the scope and type of access that particular individuals or parties may have with respect to the associated recorded conversation. Directing attention now to FIG. 8, one example of an access profile, denoted generally at 900A, is indicated that specifies the rights of a party that made the recording. As noted earlier, such rights may be defined with reference to various rules that have been defined in connection with the recording. In the illustrated example, the recording party is permitted to download, playback, delete and rename the recording, but is not permitted to forward the recording to another party or to modify the recording.

Thus, once the access profile 900A has been associated with the recording, the recording party may only perform the indicated actions with respect to the recording. In some implementations, the exemplary access profile 900A, or any other access profile, is associated with the recording by the recording management client software (see, e.g., FIG. 3) while, in other cases, the recording is uploaded from the recording device to the recording management server which then associates the access profile with the recording. In the latter instance, the recording party may be prohibited from performing any activity concerning the recording except the upload process or, alternatively, the recording may be uploaded automatically and then deleted from the memory of the recording party device, without necessitating any further action by the recording party.

Figure 9:
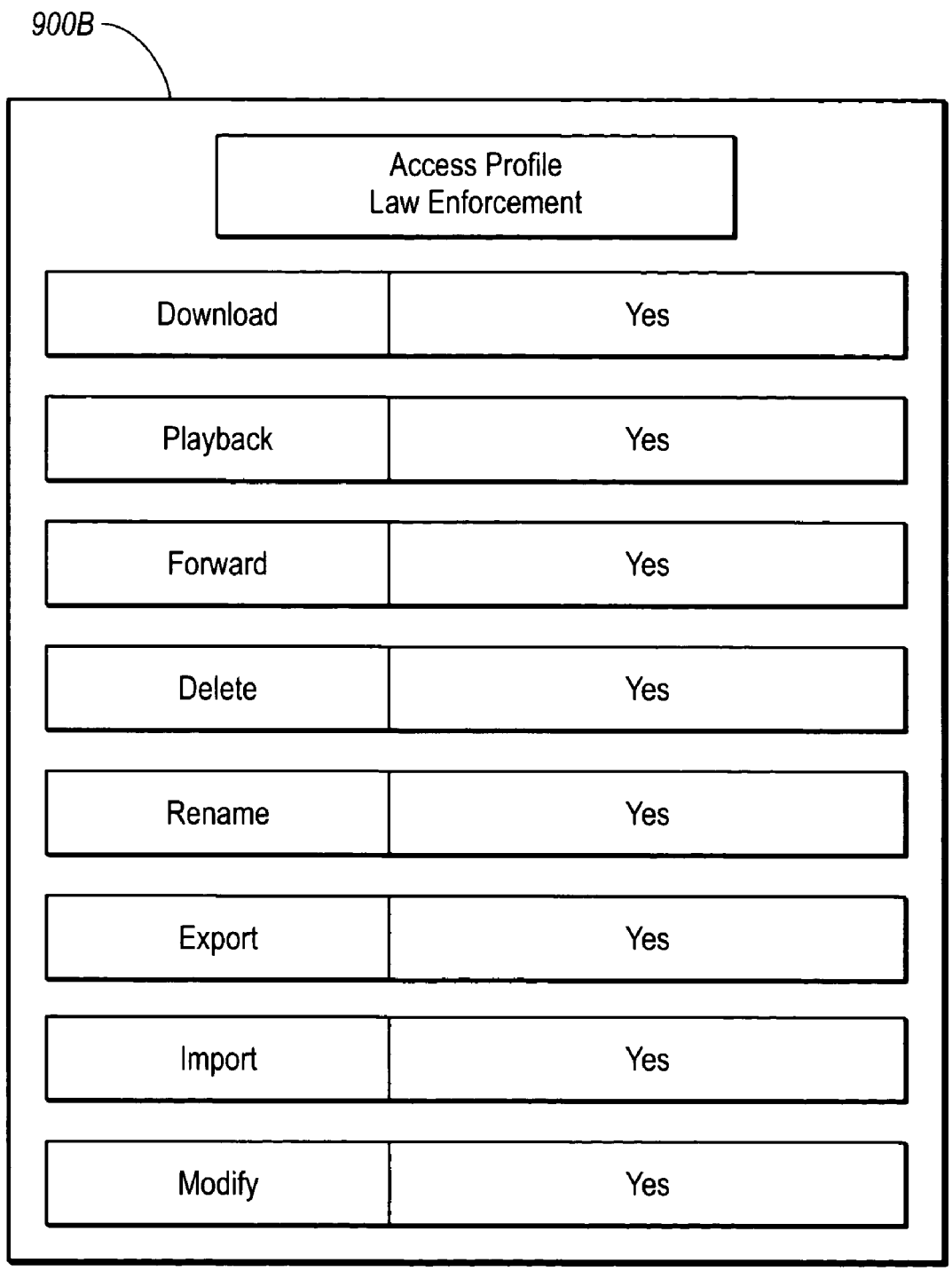
FIG. 9 illustrates aspects of an exemplary access profile such as may be constructed with respect to the rights and privileges of a law enforcement official with respect to a recorded conversation.

Another example of an access profile that may be defined and used in connection with embodiments of the invention is a law enforcement access profile, denoted at 900B in FIG. 9. As indicated there, a law enforcement official with the proper access code has substantial rights with respect to the recording. In this example, the law enforcement official is permitted to download, playback, forward, delete, rename, export, import and modify the recording.

Of course, various other types of access profiles may likewise be defined. For example, the network server 400 may be entitled to some level of access with respect to recordings obtained by way of wireless telephone network 100. For example, the network server may be permitted to download and save recordings.

In yet other implementations, multiple access profiles, such as an access profile for the recording party and an access profile for law enforcement, may be associated with a single recording. Alternatively, the access profile may be constructed so as to specify the rights and permission of multiple parties with respect to a single recording. More generally, a variety of safeguards may be employed to protect the integrity of the recording and the rights of the various parties involved.

V. Recording Processes

Figure 10:
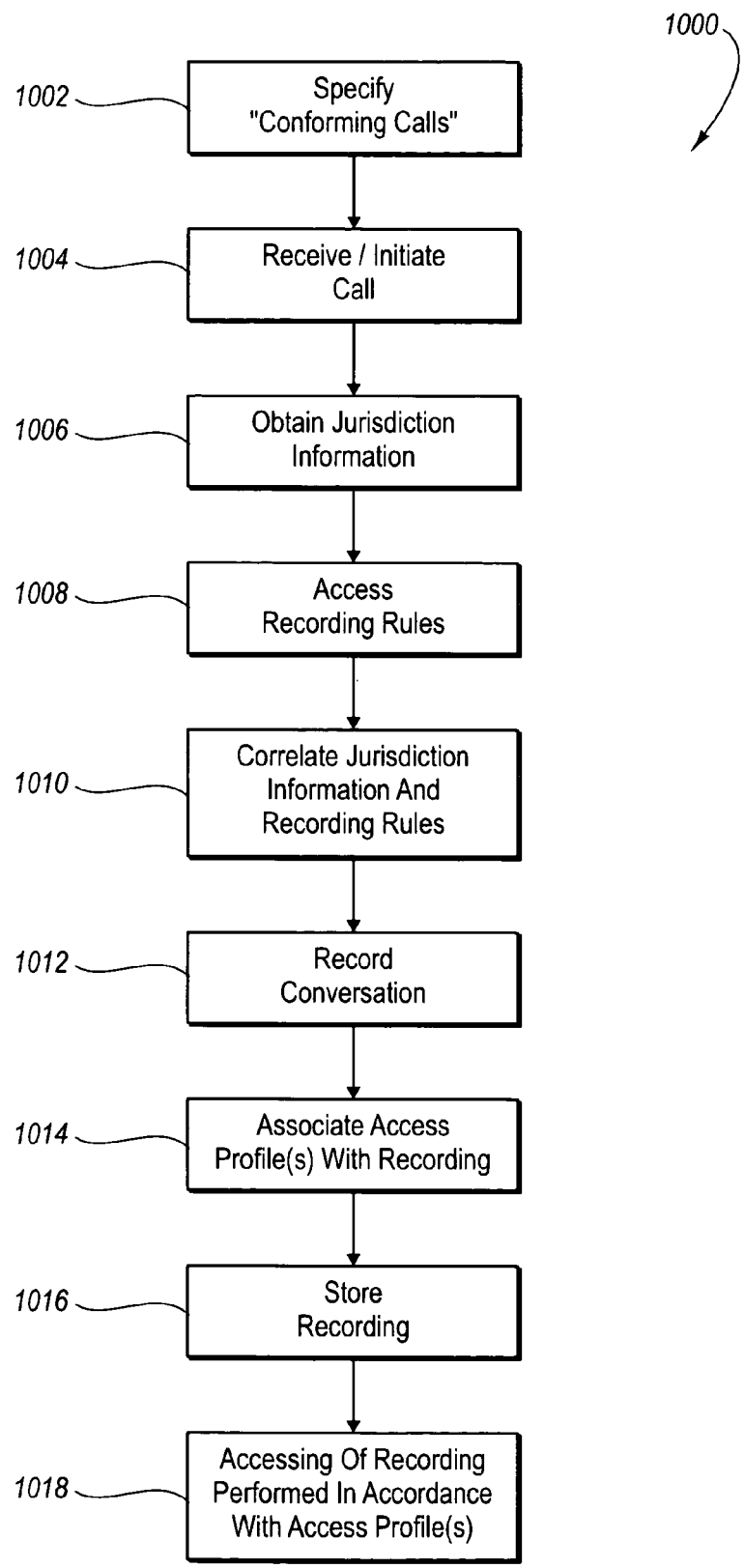
FIG. 10 is a flow chart illustrating aspects of a process for recording voice data in accordance with certain predetermined rules.

With attenuation now to FIG. 10, a process 1000 is illustrated that is concerned with the recording of a call in the context of the wireless network 100. At stage 1002 of this exemplary process 1000, the user specifies that only conforming calls are to be recorded. After the specifications have been made, the process 1000 advances to stage 1004 where the user either receives or initiates a call from, or with, another party in connection with the wireless telephone network 100.

After the connection has been made between the two or more parties, the recording party then requests or otherwise obtains location information concerning the other party from the recording management server 500 (see FIG. 1). In some exemplary implementations, the jurisdiction information, which exemplarily comprises geographic location information, is determined at a state level resolution so that the person desiring to record the call may at least be aware of the jurisdiction of the other party and, thus, the recording rules that may apply. Note that in some implementations of the invention, one or both of the remote device and recording device must be configured to report their respective locations so that the recording management server is able to obtain the requested jurisdiction information.

As noted elsewhere herein, such jurisdiction information may be obtained at various times such as during, or after, a particular conversation. In yet other cases, it is desirable to know the jurisdiction information as soon as possible after the conversation commences. This is due to the fact that in some jurisdictions, it may be an unlawful act to simply record a conversation, notwithstanding that the recording is not used or further disseminated in any way. In such instances, a recording party would want to know, at the outset, the jurisdiction of the other party so that a decision could quickly be made as to whether or not to record the conversation.

Further, some implementations of the invention provide for periodically requesting jurisdiction information. This functionality is useful, for example, where one of the parties to a conversation is traveling from one jurisdiction to another and where the respective rules of such jurisdictions differ from each other. Exemplarily, the party desiring to record the conversation is notified of the change in jurisdiction and is apprised of the implications of such a change, if any, substantially in real time, so that such party can timely evaluate whether or not an alternative course of action is required.

Location information may be obtained in a variety of different ways depending upon considerations such as, but not limited to, the type of communication devices involved in the conversation, and the availability or accessibility of the systems that provide such information. In the case of wireless communication devices, such as cellular telephones, geographical location, and usually jurisdiction, can typically be determined by identifying the cell or the base transceiver station serving the wireless device. In yet other cases, the wireless communication device of the recording party, or the recording party, or the recording management server, may be able to access GPS information that identifies the location of the other party, or parties, to the call. As another example, if one of the communication devices involved in the call is a landline device using a circuit-switched network, the location of a terminating switch serving that device is indicative of the geographical location of the land line device, and the recording management server may determine the landline device location based on the location of the switch. In the case where one of the communication devices involved in the call is a landline device using a voice over packet (VoP) network, the recording management server may initiate an internet protocol (IP) trace which shows the geographical locations of the routers used to transmit data to and from the (VoP) landline device in order to determine the device location. Additionally, both wireless and landline devices may be coupled with the 911 or enhanced 911 emergency system which can determine the location of the device user. In some cases, the recording management server may communicate with the network elements associated with the 911 system, such as the master street address guide, to receive location information.

In any case, after the jurisdiction information has been obtained in stage 1006, the process 1000 advances to stage 1008 where the recording device accesses the recording rules. At state 1010, the jurisdiction information that has been received is correlated with the recording rules and the process 1000 then advances to stage 1012 where the conversation is recorded or otherwise processed in accordance with the applicable recording rules.

After the conversation has been recorded at stage 1012, the applicable access profile, or profiles, are then associated with the recording at stage 1014 and the recording is stored at stage 1016. Subsequent to storage, the process 1000 advances to stage 1018 where the recording may be accessed and otherwise manipulated in accordance with the associated access profiles. As noted earlier herein, the access profile may be attached by the recording device, or after the recording has been uploaded from such device, by recording management server 500 (see, e.g., FIG. 1). Thus, as in the case of the recording rules, the access profiles can be stored on the remote device, the recording device, at the recording management server 500, or elsewhere on the network.

Although, as noted earlier, various jurisdictions implicate different sets of wiretap laws, and most jurisdictions provide that where all parties consent to the call being recorded, the recording of the call is lawful. Accordingly, embodiments of the invention provide for the ability to override pre-configured recording rules by obtaining consent from the parties to the call so that the call can be recorded.

Unless wireless communication devices having the capabilities disclosed herein become widely deployed, most recording events occur between a device having the recording features of the invention and a conventional device that does not have these capabilities. In this case, the consent process can be performed using the recording capabilities of the enabled device and verbal, or non-verbal, communication originating from the non-enabled device. The consent process may be implemented in a variety of ways, depending on considerations such as the configuration and functionality of the communication devices associated with the call that is to be recorded.

For example, if the jurisdictional requirements are that both parties must give consent and the remote party or parties uses a non-enabled device, the remote party can give consent to the recording in one of various ways. In one example, the remote party, or parties, may verbally assent to recordation of the call. The recording device used by the recording party records the verbal assent of the remote party. The recording device may also capture information such as the time and date the consent was given, and the device identification number and location of the communication device by way of which consent was indicated. The capture of this information can be facilitated, for example, with a menu provided to the recording party asking for confirmation of the method by which consent has been given.

In another example, the recording device used by the recording party prompts the remote party to provide consent by pressing a key or a series of keys on the remote device used by the remote party. In this case, consent to recordation of the conversation is indicated non-verbally by the remote party, or parties. The recording device used by the recording party records the resulting sequence of DTMF tones, along with information such as the time and date the consent was given, and the device identification number and location of the communication device by way of which consent was indicated. The stored tone information can then be accessed and used by the recording management system. This information can also be packaged together and saved to the recording device or to the recording management server. In cases in which a remote party uses a device enabled with recording management client software, the remote party can give consent by using a function key or soft key as further described below in reference to FIG. 11.

These methods of non-verbally indicating consent to recording are useful in a variety of situations. For example, if the connection between the two communication devices is not particularly good, a spoken consent may be somewhat garbled and hard to understand, while a tone or sequence of tones may come through somewhat more clearly and quickly. As another example, if the recording party has difficulty understanding the remote party, or parties, due to language, accent or dialect differences, the use of a DTMF tone or sequence of tones may provide a more reliable vehicle for indicating consent to record.

Once consent is given, the recording party may then manually indicate to the device to begin recording. At the conclusion of the recording act, the recording party may indicate to the device that s/he wishes to save the recording, and may then be prompted with a menu to indicate to the system the method by which the recorded party(ies) gave consent. In this case, the recording party would indicate that verbal consent was given by the recorded party, and this consent information would then be packaged along with the recorded voice data, the recorded spoken consent, time and date stamps, and device identification and location information, and saved to the device or to a server on a network. In this way, the agreement between the parties can be memorialized, thereby foreclosing future disagreements about whether or not consent to record was given by the remote party.

At least some implementations of the invention provide for ongoing reminders that a call is being recorded. For example, after the consent process has been implemented and all parties have agreed to recordation of the call, the communication device of the recording party periodically transmits a tone or beep to each party to the call as a reminder that the call is being recorded. Transmission of this tone may be optional, or automatically implemented, depending upon the configuration of the recording management software. This aspect of exemplary embodiments of the invention is useful where, for example, another party joins the call after recording has already begun. The tone notifies this party that the call is being recorded and the party can then decide whether or not to continue to participate in the call. For example, this party may affirmatively indicate consent to recording, in the manner disclosed elsewhere herein, or may implicitly consent by continuing to participate in the call. Alternatively, this party may listen to, but not participate in, the call, or may simply hang up.

It should be noted that while the notification functionality disclosed herein is useful in situations where the parties have provided consent, the scope of the invention is not so limited. Rather, at least some embodiments of the invention are configured to implement such notifications in situations where less than all parties have consented to recording of the conversation. As with other aspects of exemplary embodiments of the invention, notification in these situations may be performed, consistent with an applicable set of recording rules, at the option of the recording party, or may alternatively be implemented automatically.

Figure 11:
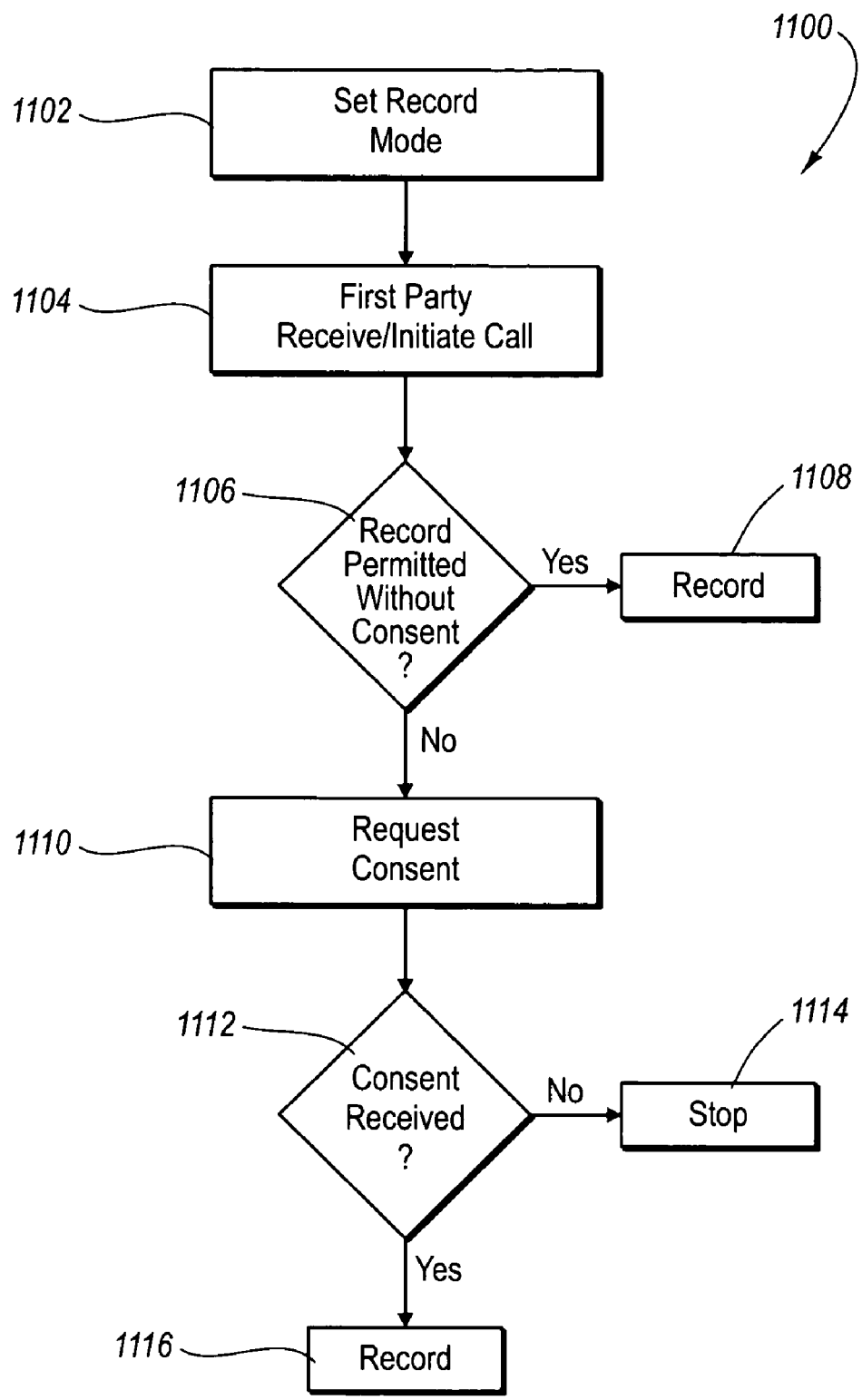
FIG. 11 is a flow chart illustrating aspects of a process for requesting, obtaining and managing consent.

While at least some recording events occur in a communication session involving a device that does not have the recording and consent features disclosed herein, the methods also extend to cases in which all participating devices include these features. With reference now to FIG. 11, an example of a process 1100 for obtaining consent in this type of communication session is illustrated.

As shown in FIG. 11, the user sets the RECORD mode at stage 1102 and no further action takes place until stage 1104 where one party receives or initiates the call. Once the connection has been made, the process 1100 advances to decision point 1106 where a determination is made, with reference to the recording rules and jurisdiction information, as to whether the conversation may lawfully be recorded without the consent of the non-recording party. If the conversation is permitted to be recorded, the process advances to stage 1108 where the conversation is recorded.

If, on the other hand, the jurisdiction information and recording rules indicate that the conversation may not be recorded, or if the parties wish to obtain consent for any of a number of other reasons, the process advances to stage 1110 where either party to the conversation may request the consent of the parties. After consent has been requested, the process advances to a decision point at stage 1112 where it is determined whether or not consent has been received from the party from whom consent was requested. In one implementation of the invention, the party or parties indicate consent by selecting one or more keys or soft keys, corresponding to a consent code, or by issuing a verbal command. If consent is not received from the party from whom consent was requested, the process 1100 stops at stage 1114 and no recording of transmissions from that party are recorded, although the prospective recording party may still record its own transmissions. If, on the other hand, consent is received by the recording management system, the process advances to stage 1116 where the conversation is recorded. In at least one embodiment, no recording takes place until recordation of the consent has been verified to be completed.

Finally, while the foregoing discussion is primarily concerned with the exemplary case where the consent decision is made at the beginning of a conversation, it should be noted that the decision to obtain consent can, more generally, be made at any point during the conversation.

Figure 12:
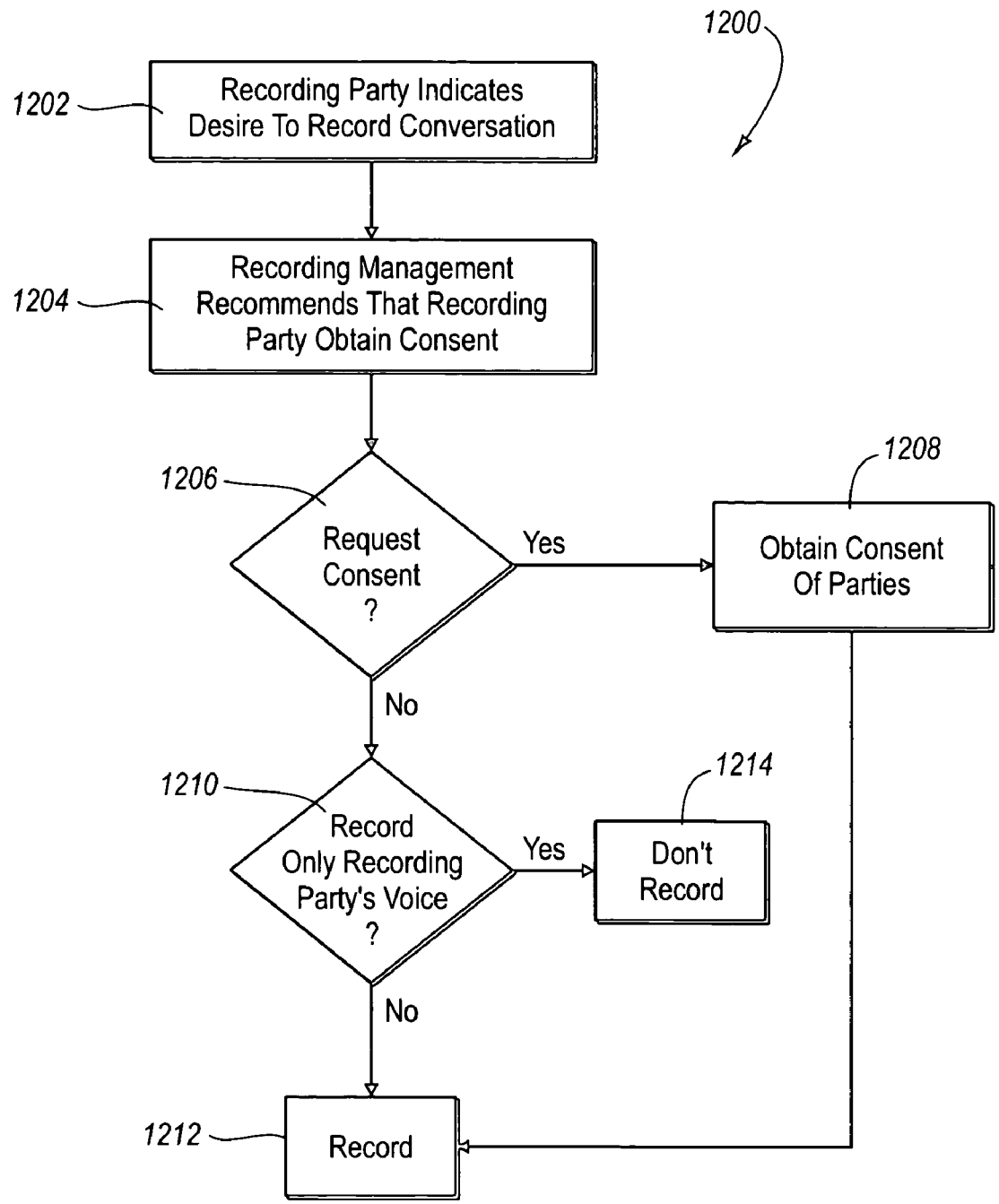
FIG. 12 is a flow chart illustrating aspects of a process for recording local voice data and not recording remote voice data.

With reference now to FIG. 12, details are provided concerning a process 1200 concerning a situation where a recording party may not wish to obtain consent for recording a conversation, notwithstanding a recommendation by the recording management system to do so. At stage 1202, the recording party indicates to the recording device that he wishes to record a conversation. The recording management server then attempts to determine the locations of the parties to the call. If the recording management server discovers that the applicable wiretap laws dictate that consent must, or should, be obtained, or if the recording management server is unable to reliably determine the location of one or more parties, stage 1204 is entered where the recording management server recommends that consent be obtained. At stage 1206 a decision point is reached where the recording party must decide if s/he wishes to request the consent of the parties. If so, consent is requested at stage 1208 and, if obtained, the process 1200 advances to stage 1212 where the call is recorded. If, on the other hand, the recording party decides at decision point 1206 not to request the consent of the remote parties, the process advances to another decision point at stage 1210 where the recording party must decide whether to proceed with recording only his or her own voice data. If the recording party does not wish to record only his or her own voice data, the process end at stage 1214. Otherwise, only the voice data of the recording party is recorded at stage 1212.

VI. Telecommunication Devices and Computing Environments

Embodiments of the present invention may be implemented in connection with a special purpose or general purpose telecommunications device, including wireless telephones and other telephony-enabled wireless devices, landline telephones, or special purpose or general purpose computers that are adapted to have telecommunications capabilities. Embodiments within the scope of the present invention also include computer-readable media for carrying or having computer-executable instructions or electronic content structures stored thereon, and these terms are defined to extend to any such media or instructions that are used with telecommunications devices.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code in the form of computer-executable instructions or electronic content structures and which can be accessed by a general purpose or special purpose computer, or other computing device.

When information is transferred or provided over a network or another communications connection (either hardwired, wireless, or a combination of hardwired or wireless) to a computer or computing device, the computer or computing device properly views the connection as a computer-readable medium. Thus, any such a connection is properly termed a computer-readable medium. Combinations of the above should also be included within the scope of computer-readable media. Computer-executable instructions comprise, for example, instructions and content which cause a general purpose computer, special purpose computer, special purpose processing device or computing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. A method for processing voice data in a telecommunications system that includes a remote device and a recording device, the method comprising:
   receiving at the recording device, voice data that has been transmitted from the remote device;
   obtaining information concerning a first geographical location of the remote device and concerning a second geographical location of the recording device;
   performing conflict resolution between a first jurisdiction of the first geographical location and a second jurisdiction of the second geographical location by applying a set of rules to the first and second jurisdiction to identify at least one course of action concerning recording of the voice data, the set of rules including data recording rules for one or more jurisdictions;
   implementing the at least one corresponding course of action;
   automatically generating an access profile according to the set of rules; and
   associating the access profile with any recording resulting from the at least one course of action, wherein the access profile specifies types of access that a user has with respect to the recording that was created by the user.

2. The method as recited in claim 1, wherein the at least one corresponding course of action comprises at least one of:
   advising a user that the first geographical location of the remote device cannot be determined;
   advising a user as to whether the voice data may be recorded;
   recording the voice data transmitted from the remote device;

recording voice data originating from the recording device;
advising a user as to whether a party associated with the remote device must be notified prior to recordation of the voice data;
preventing recording of the voice data;
enabling a user to record the voice data, notwithstanding any contrary provision in the voice data recording rules, if the user obtains consent from a party associated with the remote device;
notifying a party associated with the remote device that the voice data will be recorded;
recording the voice data and notifying a party associated with the remote device that the voice data is being recorded;
recording consent of a party, associated with the remote device, to recording of the voice data; and
associating recorded voice data with a corresponding recorded consent.

3. The method as recited in claim 1, wherein the first jurisdiction of the remote device and the second jurisdiction of the recording device are different jurisdictions during the time that the voice data is transmitted from the remote device to the recording device.

4. The method as recited in claim 1, wherein the first jurisdiction of the remote device and the second jurisdiction of the recording device are same jurisdiction during the time that the voice data is transmitted from the remote device to the recording device.

5. The method as recited in claim 1, wherein the set of data recording rules define conditions under which one or more jurisdictions permit recording of voice data.

6. The method as recited in claim 1, wherein obtaining information concerning a first geographical location of the remote device and concerning a second geographical location of the recording device comprises determining the geographical location of at least one of the remote device and the recording device using a global positioning system.

7. The method as recited in claim 1, wherein obtaining information concerning a first geographical location of the remote device and concerning a second geographical location of the recording device comprises determining the first geographical location of at least one of the remote device or the second geographical location of the recording device by communicating with a network server than can identify the geographical location.

8. The method as recited in claim 1, wherein the data recording rules are stored in at least one of the remote device and the recording device.

9. The method as recited in claim 1, wherein:
the data recording rules are stored in a network server; and
performing conflict resolution comprises accessing the data recording rules from the network server.

10. The method as recited in claim 1, wherein implementing the at least one course of action comprises:
recording the voice data that has been transmitted by the remote device; and
recording voice data generated by a user of the recording device.

11. The method as recited in claim 10, wherein recording the voice data is performed at the recording device.

12. The method as recited in claim 10, wherein recording the voice data is performed at a location remote with respect to the recording device.

13. The method as recited in claim 1, wherein implementing the at least one course of action comprises recording only voice data originating from the recording device.

14. The method as recited in claim 1, wherein the first or second geographical location comprises a particular state.

15. The method as recited in claim 1, wherein the first or second geographical location comprises a jurisdiction having an associated recording statute.

16. The method as recited in claim 15, wherein the associated recording statute comprises one of: a single party consent statute; and, an all party consent statute.

17. The method as recited in claim 1, wherein obtaining information concerning a first geographical location of the remote device and concerning a second geographical location of the recording device comprises obtaining information as to whether or not the first geographical location of the remote device can be identified.

18. In a recording device that operates with a remote device in a telecommunications system, a method for determining whether voice data associated with a communication session between the recording device and the remote device is to be recorded, the method comprising:
participating in a communication session between the recording device and the remote device during which outgoing voice data is transmitted from the recording device to the remote device and incoming voice data is transmitted from the remote device to the recording device;
obtaining information concerning a first geographical location of the recording device;
associating the information concerning the first geographical location of the recording device with the outgoing voice data and the incoming voice data;
performing conflict resolution based on a set of voice data rules that includes a first jurisdiction associated with the geographical location of the recording device and a second geographical location associated with the remote device, wherein the conflict resolution determines:
whether the outgoing voice data is to be recorded;
whether the incoming voice data is to be recorded; and
whether a party using the remote device is to be notified that voice data is to be recorded;
generating a recording of at least one of the outgoing voice data and the incoming voice data;
automatically generating an access profile according to the set of voice data rules; and
associating the access profile with the recording, the access profile specifying types of access that one or more users have with respect to the recording.

19. The method as recited in claim 18, wherein obtaining information concerning a first geographical location of the recording device comprises determining the first geographical location of the recording device using global positioning system capabilities of the recording device.

20. The method as recited in claim 18, further comprising obtaining information concerning the second geographical location of the remote device.

21. The method as recited in claim 20, further comprising associating the information concerning the second geographical of the remote device with the outgoing voice data and the incoming voice data such that the set of voice data rules are applied with respect to the second geographical location of the remote device and the first geographical location of the recording device.

22. A computer apparatus for implementing a method for processing voice data in a telecommunications system that includes a remote device and a recording device, the computer apparatus comprising:

a computer readable medium embodying computer executable instructions for performing the method, wherein the method comprises:

receiving at the recording device, voice data that has been transmitted from the remote device;

obtaining information concerning a first geographical location of the remote device and concerning a second geographical location of the recording device;

accessing a set of voice data recording rules;

performing conflict resolution between a first jurisdiction of the first geographical location and a second jurisdiction of the second geographical location by applying a set of rules to the first and second jurisdiction to identify at least one course of action concerning recording of the voice data, the set of rules including data recording rules for one or more jurisdictions;

recommending a particular course of action based on the conflict resolution from the at least one course of action;

implementing the particular course of action;

generating an access profile according to the set of rules; and automatically associating the access profile with any recording resulting from the at least one course of action, wherein the access profile specifies types of access that a user has with respect to the recording.

23. The computer apparatus as recited in claim 22, wherein the particular course of action comprises at least one of:

advising a user as to whether the voice data may be recorded;

recording the voice data; advising a user as to whether a party associated with the remote device must be notified prior to recordation of the voice data;

preventing recording of the voice data;

enabling a user to record the voice data, notwithstanding any contrary provision in the data recording rules, if the user obtains consent from a party associated with the remote device;

notifying a party associated with the remote device that the voice data will be recorded;

recording the voice data and notifying a party associated with the remote device that the voice data is being recorded; and recording consent of a party, associated with the remote device, to recording of the voice data.

24. The computer apparatus as recited in claim 22, wherein the voice data recording rules are stored at the recording device.

25. The computer apparatus as reciting in claim 22, wherein:

the data recording rules are stored in a network server; and accessing the data recording rules comprises accessing the data recording rules from the network server.

26. The computer apparatus as recited in claim 22, wherein the set of voice data recording rules comprises at least one of:

conditions under which a jurisdiction permits recording of voice data; and at least one conflict resolution recommendation.

27. The computer apparatus as recited in claim 22, wherein obtaining information concerning a first geographical location of the remote device and concerning a second geographical location of the recording device comprises determining the first or second geographical of at least one of the remote device and the recording device using global positioning system capabilities thereof.

28. The computer apparatus as recited in claim 22, wherein obtaining information concerning a first geographical location of the remote device and concerning a second geographical location of the recording device comprises determining the first or second geographical location of at least one of the remote device and the recording device by communicating with a network server that can identify the first or second geographical location.

29. A method for processing voice data in a telecommunications system that includes a remote device and a recording device, the method comprising:

receiving, at the recording device, voice data that has been transmitted from the remote device;

performing conflict resolution using a set of rules that includes rules of a first jurisdiction associated with the recording device and rules of a second jurisdiction associated with the remote device, wherein the conflict resolution identifies a course of action that includes requiring consent from a user of the remote device;

recommending the course of action to a user of the recording device;

requesting consent data specifying that the user associated with the remote device has given consent to the recording of voice data;

if the consent data is received:

storing the consent data at the recording device; and recording the voice data transmitted from the remote device, the consent data associated with the recorded voice data;

automatically generating an access profile according to the set of rules; and associating the access profile with the recorded voice data, the access profile specifying actions that a user of the recording device can perform with respect to the recorded voice data.

30. The method as recited in claim 29, further comprising receiving and storing consent data from all users who are participating in a communication session between the recording device and one or more remote devices.

31. The method as recited in claim 29, further comprising recording only voice data originating from the recording device.

32. The method as recited in claim 31, wherein recording only voice data originating from the recording device is performed in response to not receiving the consent data from the remote device.

33. A method for processing voice data in a telecommunications system that includes a remote device and a recording device, the method comprising:

storing, at the recording device, recording rules that identify a recording action that is to be performed on voice data in response to specified criteria;

receiving, at the recording device, voice data that has been transmitted from the remote device; and in response to the receipt of the voice data:

performing conflict resolution based on a first location of the recording device, a second location of the remote device and on recording rules, the conflict resolution identifying a recording action to perform;

recommending the recording action to a user of the recording device based on the conflict resolution; and performing the recording action unless the user of the recording device selects a different recording action, wherein the different recording action is performed;

generating a recording of the voice data;
automatically generating an access profile according to the recording rules; and
associating the access profile with the recording of the voice data, wherein the access profile specifies actions a party that made the recording of the voice data can perform with respect to the recording of the voice data.

34. The method as recited in claim 33, further comprising receiving and storing, at the recording device, consent data specifying that a user associated with at least one of the remote device and the recording device has given consent to the recording of voice data.

35. The method as recited in claim 33, wherein performing conflict resolution further comprises determining that the recording rules identify the remote device and specify that when voice data is received from the remove device, a particular recording action is to be performed on the voice data.

36. The method as recited in claim 33, wherein:

the method further comprises obtaining information:

that is related to the first location of the recording device and the second location of the remote device; and the identifies a recording action that is to be performed on voice data in response to specified criteria that include said first location of the remote device or said second location of the recording device.

37. The method as recited in claim 33, further comprising receiving user input at the recording device that defines the recording rules such that the recording action that is to be performed on voice data in response to specified criteria can be defined by a user of the recording device.

* * * * *

UNITED STATES PATENT AND TRADEMARK OFFICE
CERTIFICATE OF CORRECTION

| | | |
|---|---|---|
| PATENT NO. | : 7,227,930 B1 | Page 1 of 2 |
| APPLICATION NO. | : 10/969487 | |
| DATED | : June 5, 2007 | |
| INVENTOR(S) | : Othmer et al. | |

It is certified that error appears in the above-identified patent and that said Letters Patent is hereby corrected as shown below:

Drawing Sheet
Drawing Sheet 9, replace FIG. 12 with the figure depicted herein below, wherein the response to item 1210 to 1214 has been changed from "Yes" to --No--

Drawing Sheet 9, replace FIG. 12 with the figure depicted herein below, wherein the response to item 1210 to 1212 has been changed from "No" to --Yes--

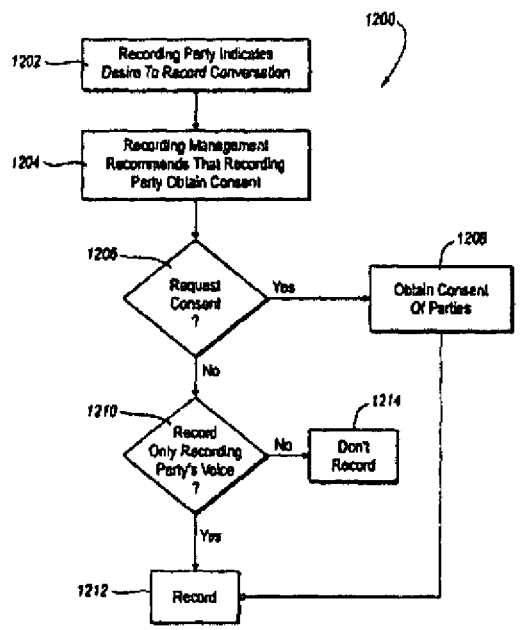

Fig. 12

UNITED STATES PATENT AND TRADEMARK OFFICE
CERTIFICATE OF CORRECTION

PATENT NO. : 7,227,930 B1
APPLICATION NO. : 10/969487
DATED : June 5, 2007
INVENTOR(S) : Othmer et al.

It is certified that error appears in the above-identified patent and that said Letters Patent is hereby corrected as shown below:

Column 9
Line 46, after "SETUP" insert --306--
Line 51, after "SETUP" insert --306--

Column 22, Claim 21
Line 59, after "geographical" insert --location--

Column 23, Claim 27
Line 67, after "geographical" insert --location--

Column 25, Claim 35
Line 16, change "remove" to --remote--

Column 26, Claim 36
Line 7, before "identifies" change "the" to --that--

Signed and Sealed this

Twenty-second Day of December, 2009

David J. Kappos
*Director of the United States Patent and Trademark Office*